United States Patent [19]

Jardin et al.

[11] 4,436,691
[45] Mar. 13, 1984

[54] METHOD AND APPARATUS FOR THE FORMATION OF A SPHEROMAK PLASMA

[75] Inventors: Stephen C. Jardin, Princeton; Masaaki Yamada, Lawrenceville; Harold P. Furth; Mitcheo Okabayashi, both of Princeton, all of N.J.

[73] Assignee: The United States of America as represented by the United States Department of Energy, Washington, D.C.

[21] Appl. No.: 246,976

[22] Filed: Mar. 24, 1981

[51] Int. Cl.$^3$ .................................................. G21B 1/00
[52] U.S. Cl. ..................................... 376/137; 376/143; 376/133
[58] Field of Search ............... 376/124, 137, 146, 133, 376/134, 139, 140, 107, 143

[56] References Cited

U.S. PATENT DOCUMENTS

| | | | |
|---|---|---|---|
| 3,166,477 | 1/1965 | Leboutet | 376/140 |
| 4,229,679 | 10/1980 | Lode | 376/140 |
| 4,267,488 | 5/1981 | Wells | 376/107 |
| 4,363,776 | 12/1982 | Yamada et al. | 376/133 |

OTHER PUBLICATIONS

*S-1 Spheromak*, Princeton University, Plasma Physics Lab. Aug. 24, 1979.
Proc. of the Second Int. Conf. on Peaceful Uses of Atomic Energy, vol. 31, 1958, pp. 3–5, Alfven.
Physical Review Letters, 1/81, vol. 46, No. 3, pp. 188–191.
Nuclear Fusion, vol. 20, No. 12, (1980), pp. 1624,1625.
Glasstone et al., "Controlled Thermonuclear Reactions, D. Van Nostrand Co. Inc., Princeton, N.J., pp. 442,443.

*Primary Examiner*—Harvey E. Behrend
*Attorney, Agent, or Firm*—Steven M. Rabin; Bruce R. Mansfield; Michael F. Esposito

[57] ABSTRACT

An inductive method and apparatus for forming detached spheromak plasma using a thin-walled metal toroidal ring, with external current leads and internal poloidal and toroidal field coils located inside a vacuum chamber filled with low density hydrogen gas and an external axial field generating coil. The presence of a current in the poloidal field coils, and an externally generated axial field sets up the initial poloidal field configuration in which the field is strongest toward the major axis of the toroid. The internal toroidal-field-generating coil is then pulsed on, ionizing the gas and inducing poloidal current and toroidal magnetic field into the plasma region in the sleeve exterior to and adjacent to the ring and causing the plasma to expand away from the ring and toward the major axis. Next the current in the poloidal field coils in the ring is reversed. This induces toroidal current into the plasma and causes the poloidal magnetic field lines to reconnect. The reconnection continues until substantially all of the plasma is formed in a separated spheromak configuration held in equilibrium by the initial external field.

14 Claims, 34 Drawing Figures

C&M=CONTROL & MONITOR SIGNALS

METHOD AND APPARATUS FOR THE FORMATION OF A SPHEROMAK PLASMA

The U.S. Government has rights in this invention pursuant to contract AF-02-30-11 between the U.S. Department of Energy and Princeton Plasma Physics Laboratory, Princeton N.J.

BACKGROUND OF THE INVENTION

This invention relates to the confinement of plasmas by magnetic fields and, more particularly, to an improved method and apparatus for the formation of a spheromak plasma (compact torus).

Devices employed for the containment of plasmas by magnetic fields may have various configurations. Two well-known types of such devices are the open-ended type, such as the magnetic mirror type, and the toroidal type, such as the tokamak. The underlying principle of all types of such containment devices is the containment of a hot, dense ionized gas away from physical walls for a time sufficient to allow fusion reactions to take place.

An advantage of the mirror-type device is that it has a coil-blanket topology which does not link the plasma. However, the mirror-type open ended apparatus has a disadvantage in that since the magnetic field lines do not close upon themselves, the trapped charge particles may escape while travelling along the magnetic field lines which define their spiral orbits. It occurred to many people in the early days of fusion research that mirror end losses could be easily eliminated simply by bringing the two ends of the straight cylinder on themselves, thus forming the well-known torus device.

The toroidal-type devices have an advantage in that plasma is well confined in the closed magnetic field lines. Since the ions tend to remain in a spiral orbit about a given set of magnetic field lines the continuity of the magnetic field lines inside the apparatus enhances containment. A tokamak clearly has this above-mentioned advantage but suffers from a difficult topology in which the coil blanket links the toroidal plasma.

The spheromak combines the most advantageous aspects of the above-discussed toroidal and mirror schemes. The spheromak is characterized by magnetic field lines which are closed, as in a tokamak, and by a coil blanket topology which does not link the plasma, as in a mirror-type device.

Among the advantages of this speromak formation scheme is the ability to keep the physical structure of the apparatus away from the plasma, thus reducing absorbed impurities and keeping the plasma "hot." Also, the spheroidal blanket simplifies the design and construction of the reactor apparatus. The magnetic field configuration of the spheromak includes both toroidal and poloidal components, but the toroidal component is maintained entirely by plasma currents, and, therefore, it vanishes outside the plasma. The outward pressure of the toroidal field and of the plasma is balanced by the inward pressure of a poloidal field.

For additional background discussions relating to the spheromak configuration, the reader is referred to *S-1 Spheromak*, Princeton University, Plasma Physics Laboratory, Aug. 24, 1979, the disclosure of which is hereby incorporated by reference.

Three known methods of spheromak plasma formation suitable for spheromak start-up have been experimentally confirmed. The first of these is the so-called "Marshall gun" approach, which is discussed in Alfven, *Proceedings of the Second International Conference on Peaceful Uses of Atomic Energy* 31 (1958). This approach is characterized by the establishment of an initial poloidal field, followed by the application of toroidal flux through an electrode system. Plasma inertia is relied upon to immobilize the toroidal flux while the poloidal field lines are reconnected within the plasma. This approach has the disadvantage of requiring formation on a dynamic time scale, leading to questions of whether the internal poloidal flux is adequately reconnected. Also, since an electrode system is used, this formation scheme may suffer from problems of erosion and impurity influx, causing plasma cooling problems.

Another known scheme suitable for spheromak start-up is the familiar reversed-field theta-pinch approach, as discussed in *Centre de Recherches en Physique des Plasmas*, Lausanne, Switzerland (1978-79). This scheme is quite similar to the Marshall-gun approach, and thus suffers from the same disabilities. The major difference between the two approaches is that the geometry of the plasma forming structure is rotated by 90° relative to that of the Marshall-gun approach, thus producing radial, rather than axial, plasma acceleration.

An improved method and apparatus for inductively forming a detached spheromak plasma configuration wherein the plasma may be contained at a substantial distance away from physical walls is disclosed in a published report entitled *S-1 Spheromak*, Princeton Plasma Physics Laboratory, Princeton, N.J. (Aug. 24, 1979). The original S-1 Spheromak described in that report is useful for forming a hot plasma, and for generating possibly large quantities of X-rays and neutrons, and can be used in numerous instances where neutrons are needed, as for example in the formation of medical isotopes.

The original S-1 Spheromak, which is illustrated in FIG. 1, includes a toroidally-shaped flux core having a radially interior major radius side and a radially exterior major radius side which includes both poloidal and toroidal magnetic field generating coils; a generally spheroidal vacuum vessel for enclosing the flux core; a pair of external equilibrium field coils for supporting the detached plasma; and a pair of pinching coils for pinching off or severing a portion of the plasma and for causing poloidal magnetic field line reconnection, such that the detached plasma may be contained at a distance from physical structure.

The original S-1 spheromak has been described in the aforementioned report to operate by energizing the external equilbrium field coils to produce a first poloidal magnetic field; energizing the poloidal coil of the flux core to produce a second poloidal magnetic field, thereby to produce a composite poloidal field which is stronger on the radially exterior major radius side of the flux core than on the radially interior major radius side; energizing the toroidal coil of the flux core to initiate a plasma discharge and to emit toroidal flux which becomes trapped in, and expands, the poloidal flux, such that the plasma expands toward the radially interior major radius side of the flux core, and; pinching off a portion of the distended plasma by energizing the pinching coils so as to produce a detached spheromak plasma. The time variation of the currents applied to each of these coils in accordance this prior method is illustrated in FIG. 2.

In U.S. Pat. No. 4,363,776 which is assigned to the same assignee as the present application, the original S-1 Spheromak is described, and its operation to produce a detached spheromak plasma with and without the use of the pinching coil is also described. In accordance with the operation of the original S-1 Spheromak without the use of the pinching coils described in U.S. Pat. No. 4,363,776, the poloidal coil is deenergized at a particular time to produce the spheromak plasma. That is, after the external and poloidal coils have been energized to form the poloidal field and the toroidal coil has been energized to initiate a plasma discharge and to emit toroidal flux which becomes trapped in and expands the poloidal flux, such that the plasma expands toward the major axis of the system, the poloidal coil current is turned off to produce a detached spheromak plasma. Thus, it is known to detach the spheromak plasma by either energizing pinching coils or turning off the poloidal coils at an appropriate time. Experimenters with these two approaches have, however, found that at most only approximately 50 percent of the plasma can be detached from the flux core in this manner.

Another limitation of the original S-1 Spheromak is that its arrangement of external equilibrium coils and poloidal field coils resulted in poloidal flux intercepting the flux core and attendant plasma loses to the flux core.

SUMMARY OF THE INVENTION

The present invention provides a much improved apparatus and method for inductively forming a detached spheromak plasma configuration wherein the detached plasma includes substantially all of the plasma initially surrounding the spheromak flux core. The invention is, therefore, twice as efficient as the prior methods and apparatus and, not using pinching coils, requires only 3 external circuits rather than 4 as in the original S-1 Spheromak described above.

The method of the present invention comprises the steps of energizing a set of external equilibrium field coils to produce a first poloidal magnetic field, energizing a poloidal coil formed in a toroidally-shaped ring core with a direct current to produce a second poloidal magnetic field, thereby to produce a composite poloidal field which is stronger on the radially exterior major radius side of the core then on the radially interior major radius side, energizing a toroidal field formed in the ring core to initiate a plasma discharge and to emit toroidal flux which becomes trapped in, and expands the poloidal flux, such that the plasma expands toward the radially interior major radius side of the ring core, and, reversing the direction of the current in the poloidal coil to pinch off most of the distended plasma so as to produce a detached spheromak plasma.

The present invention also has an improved flux core. The flux core includes a set of equilibrium coils which serve to reduce the poloidal flux intercepted by the core and thereby reduce plasma loses to the core. The flux core also has a conductive shell which surrounds all of the coils within. The shell serves to stabilize the plasma during the formation phase and causes the surface of the flux core to have a constant poloidal field for time varying fields.

DETAILED DESCRIPTION OF THE PREFERRED EMBODIMENTS

The present invention is the basis for an improved version of the S-1 Spheromak referred to above which improved version is described in great detail in a report of the Princeton University Plasma Physics Laboratory, "PPPL S-1 Spheromak Project Engineering Handbook," November 1980.

The Spheromak Plasma Configuration

The spheromak plasma configuration is characterized by magnetic field lines that are closed, as in a tokamak, and by a coil blanket topology that does not link the plasma—as in a mirror-type machine. A general description of spheromak plasma configurations including its stability and geometry plasma size and density and the prior methods of formation of a spheromak plasma are provided in *S-1 Spheromak*, Princeton University, Plasma Physics Laboratory, Aug. 24, 1979.

In accordance with the inductive formation scheme of the present invention, an initial poloidal field is generated by a coil inside a toroidal ring-shaped shell (flux core). The initial poloidal field is weakened on the inner-major-radius side of this ring by superposition of a properly shaped external vertical field. The flux core also contains a toroidal field coil which is able to generate an interior toroidal flux and is, therefore, able to emit an equal and opposite toroidal flux on its exterior. In operation, when the toroidal field coil is energized, it induces a poloidal current in a sleeve-shaped plasma surrounding the flux core. The associated toroidal field distends the poloidal-field sleeve, stretching it in the direction towards the axis, where the poloidal field is weakest. Next, the current in the poloidal field coil is reversed to pinch off most or all of the distended plasma, producing a separated spheromak plasma configuration, and the electric currents inside the flux core can then be allowed to decay, while the spheromak configuration remains.

Spheromak Construction

Figure 1:
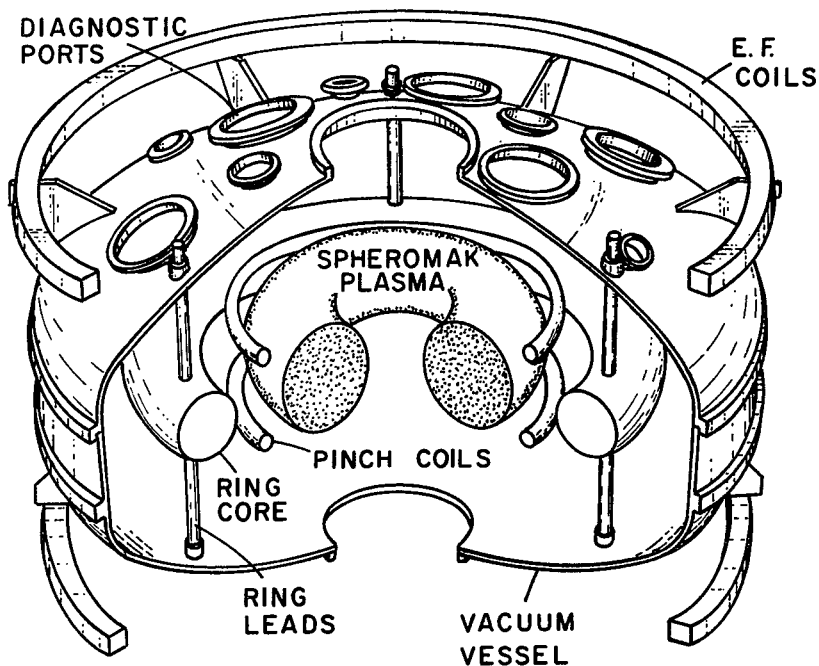
FIG. 1 is a cutaway view of a prior art spheromak plasma formation apparatus.
Figure 2:
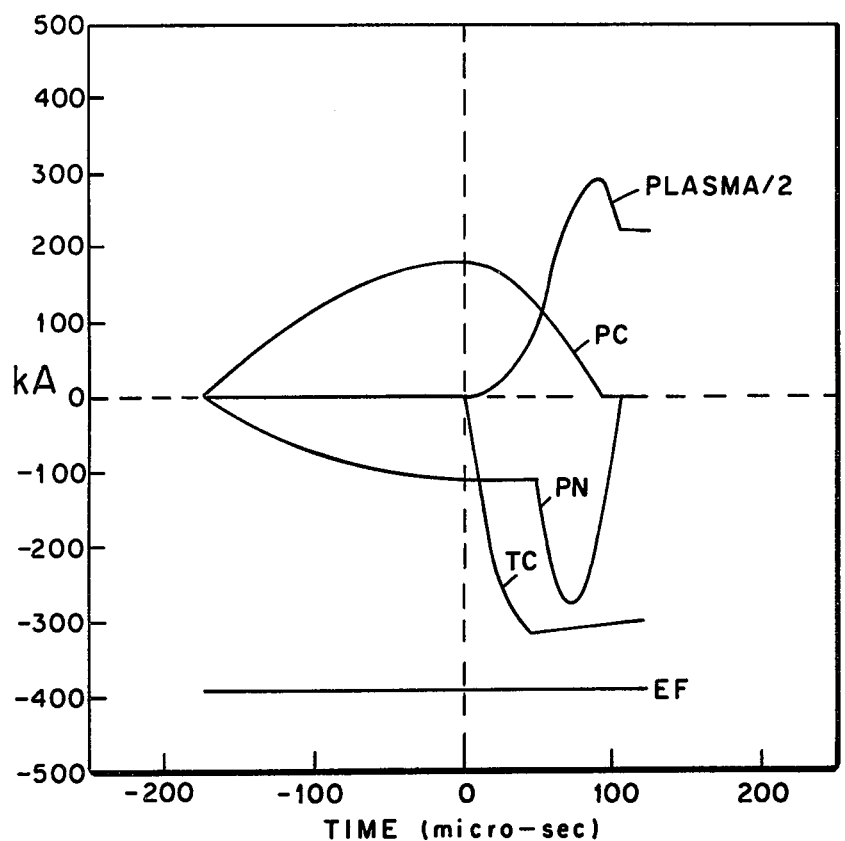
FIG. 2 is a graphical representation of the time variation of the currents in the plasma, toroidal, poloidal, pinch and equilibrium field coils in accordance with a prior method of operation of the apparatus illustrated in FIG. 1.
Figure 3A:
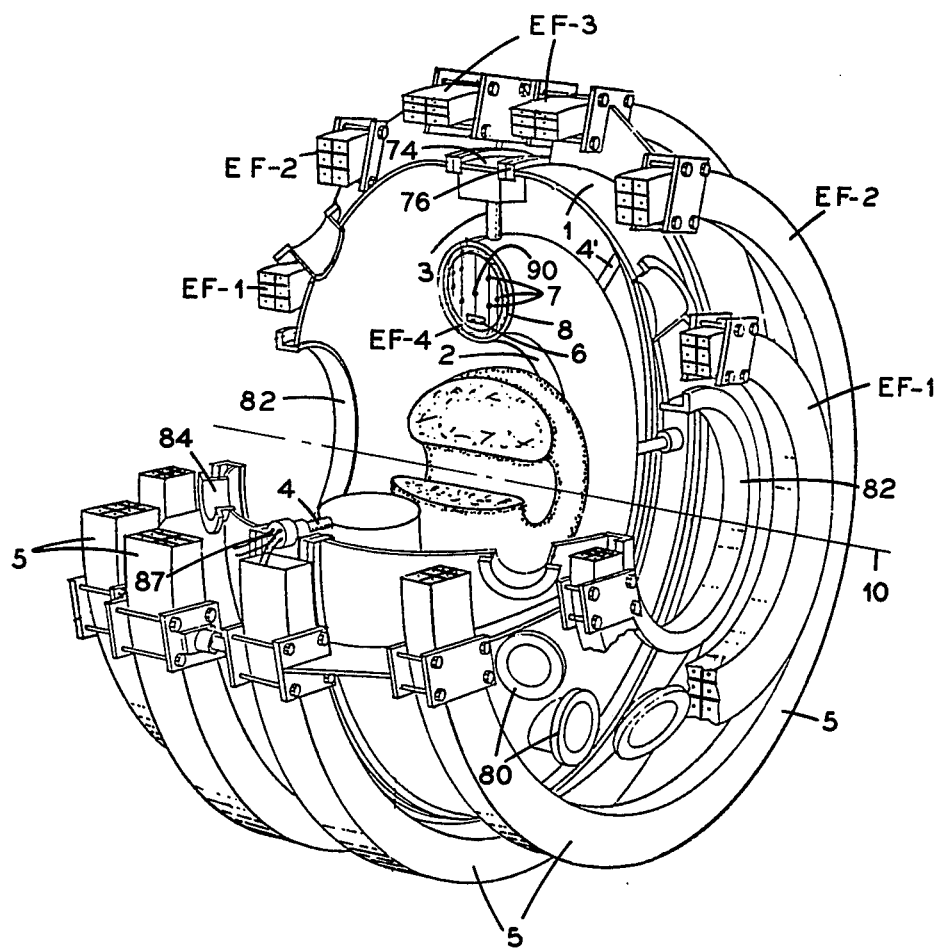
FIG. 3a is a cutaway view of spheromak plasma formation apparatus according to the present invention.
Figure 3B:
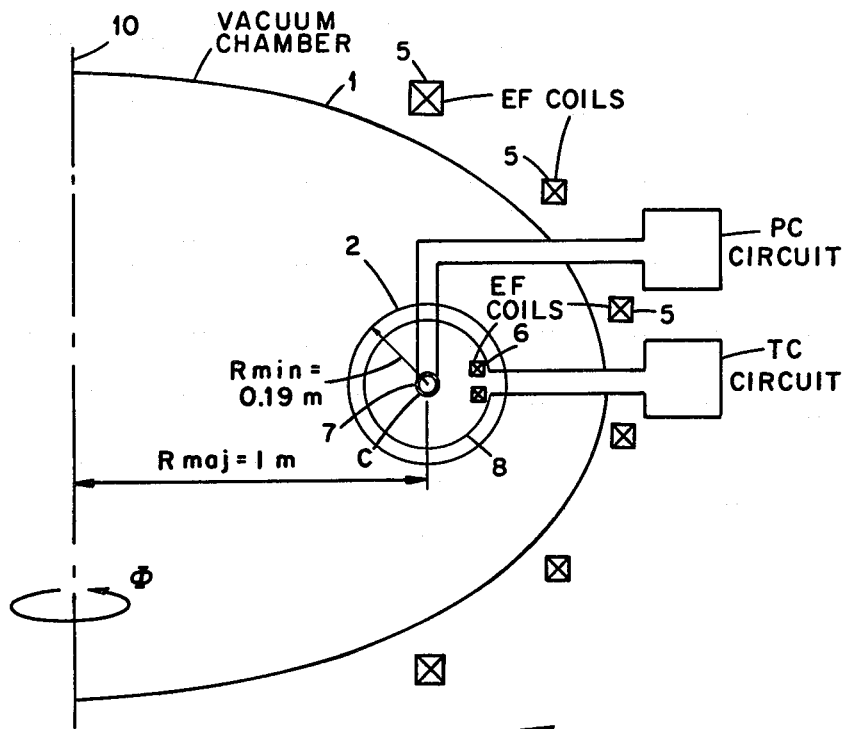
FIG. 3b schematically illustrates an arrangement of coil components of a spheromak in accordance with the present invention.

A suitable spheromak construction for practicing the method of the present invention is shown in FIGS. 3a and 3b which illustrates the construction in a cutaway view. Referring to FIGS. 3a and 3b, a generally spheroidal vacuum vessel 1 having a major axis or axis of symmetry 10 houses a flux core 2 of toroidal shape and supported within the vessel by means of three flux core tubes 3. The flux core 2 has a major radius $R_{maj}$ and a minor radius $R_{min}$ as indicated in FIG. 3b. The plane of symmetry of the flux core 2 is perpendicular to the axis 10 and extends through the center C of the flux core.

Three sets of equilibrium field (EF) coils 5 (EF-1, EF-2 and EF-3) are positioned exterior to the vacuum vessel 1 and radially outwardly of the flux core 2, spaced equidistantly above and below the flux core 2. An additional EF coil (EF-4) is positioned within the flux core.

Flux Core

The basic purpose of the flux core 2 is to house the poloidal flux coil (PC) 7 and the toroidal flux coil (TC) 8, and to protect both of these coils from the plasma. In the present exemplary embodiment the major radius of the flux core $R_{maj}$ is on the order of one meter, and the minor radius $R_{min}$ is approximately 19 centimeters. A top cutaway view and a cross-sectional view of the flux core 2 appear in FIGS. 4 and 5a, respectively, where the coils making up the PC and TC are illustrated.

Figure 4:
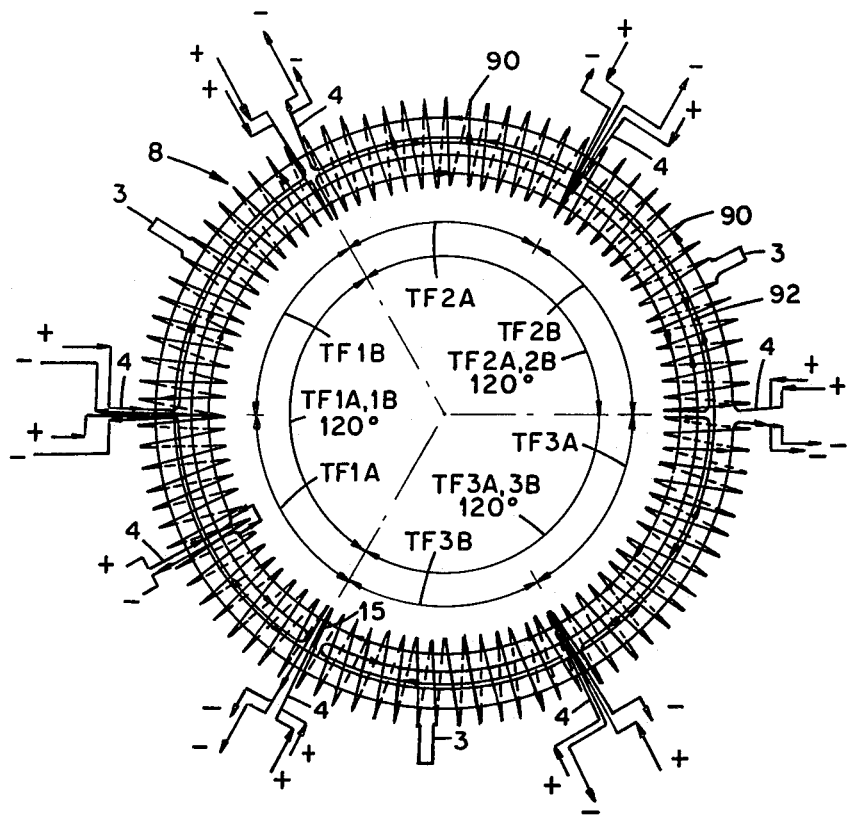
FIG. 4 is a schematic side view of the flux core and its support structure and lead wires in accordance with the present invention.

Referring to FIGS. 3a and 4, there are 10 radial arms including the three above mentioned substantially equally spaced radially extending coplanar mechanical supports 3 for the core 2 and seven radially extending lead support assemblies 4′ containing electrical leads 4 for the PC, TC and interior EF coils. The PC coils consists of six turns housed in the flux core. Each turn has a cross sectional area of 0.0997 square inch. The six turns are suitably individually insulated water cooled copper cables connected in parallel outside the vessel. The parameters of the PC coil are summarized in Table 1 for convenience.

TABLE 1
POLOIDAL FIELD WINDING PARAMETERS

| | |
|---|---|
| Total Turns | 6 |
| Max Current | 83.3 kA/turn (500 kA total through 6 turns in parallel) |
| Total NI | 0.5 Mat |
| ESW Capability | 4.5 m sec |
| Rep Rate | 180 sec |
| PC System Resistance | 0.38 mΩ |
| PC System Inductance | 3.26 μH |
| Maximum $I^2Rt$ | 0.43 MJ |
| $\frac{1}{2} L I^2$ | 0.408 MJ |
| Total Energy | 0.838 MJ |
| System GPM at Δp = 120 psi | 3.6 |
| Max Copper Temperature | 51.2° C. |
| Conductor Type and Size | 127,000 circular mil (0.0997 sq. in.) copper scalbe with an internal copper tube for water cooling; polyethylene insulation |

The coil 8 that produces the toroidal flux is divided into six sections of 15 water-cooled, sheathed copper cable turns each, each section occupying 60° of the major circumference of the flux core. Each turn has a cross section of 0.0997 square inches. Each section consists of an electrical lead, a 15 turn helical coil 90 and a return wire 92 which serves to cancel out the poloidal field effects of the current in the helical coil 90. The circuit of one of the six major sections is as follows: Current enters the corresponding lead 4, flows in the return wire 92 while traversing 60° of the flux core major circumference, and terminates in a support. Current flows from the support into the helix 90 and back 15 turns in a left hand manner to the area of the lead stem where it exits from the coil, co-axially with the entering current lead. This results in 15 turns per section for six sections, thus giving 90 turns for the toroidal flux coils 8.

TABLE 2
TOROIDAL FIELD WINDING PARAMETERS

| | |
|---|---|
| Major Radius | 1 m |
| Minor Radius | 15 cm |
| Total Turns | 90, arranged in 6 groups of 15 connected in parallel |
| Max Current | 83.3 kA/turn; 500 kA, Total |
| Total NI | 7.5 Mat |
| $B_T$ at Core Center (1 m) | 1.4 Tesla |
| ESW Capability | 4.5 m sec |
| Rep Rate | 180 sec |
| TC Coil System Resistance | 0.8 mΩ |
| TC Coil System Inductance | 3.6 μH |
| Maximum $I^2Rt$ | 0.9 MJ |
| $\frac{1}{2} L I^2$ | 0.45 MJ |
| Total Energy | 1.35 MJ |
| GPM for System at Δp = 120 psi | 2.4 |
| Max Copper Temperature | 51.2° C. |
| Conductor Type and Size | 127,000 circular mil (0.0997 sq. in.) copper cable with an internal copper tube for water cooling; polyethylene insultation |

The TC, PC and EF-4 coils are mounted within a flux core conductive shell 11 broken in both the poloidal and toroidal directions to act as a passive stabilizer and to reduce toroidal field ripple. Shell 11 is suitably composed of an aluminum spinning. Completely surround the aluminum shell 11 is a thin Inconel liner 13. Liner 13 protects the core 2 from plasma sputtering and erosion, eliminates outgassing contamination from the organic materials contained in the core, and also serves to partially smooth an induced field during the initial breakdown state. Liner 13 is a major change from the original S-1 design described in U.S. Pat. No. 4,363,776, and was made possible by a doubling of the time scale of the pulse allowing the TC and PC fluxes to be expelled and the energy dissipated in the resistive Inconel liner to be acceptable. Manufacturing liner 13 using a ductile metal should greatly reduce the risk of fracture during assem liner 13 may be done by welding, simplifying the procedures in the original S-1 design.

The TC and PC coils and the EF-4 are supported by a monolithic matrix of fiberglass and epoxy, which also acts as electrical insulation. The matrix may be made by several repetitive impregnating and curing steps, using either one mold with filler blocks or multiple molds, whichever is more cost effective.

As previously noted, there are provided 10 electrical lead/mechanical support tubes affixed to the core 2. As is illustrated in FIG. 4, all of these tubes are coplanar. The three support tubes 3 are spaced equally apart on the major circumference of the flux core 2. Of the seven electrical lead assemblies 4', there are three electrical lead assemblies for the TC coils 8, three lead assemblies for the PC coils 7 and one lead assembly for the EF-4 coil. The electrical leads are water-cooled conductive tubes. The entire flux core is covered by the Inconel liner 13 which is in the present example is 0.010 inch thick.

The TC and PC cables each have a net copper area of 0.0997 sq. in. This is sufficient to absorb the adiabatic heating, but clearly cannot support the large tensile load resulting from magnetic pressure within a coil winding. Thus, the cable must be well supported in such a manner that the load is primarily resisted by support structure rather than the cable. To accomplish this, the poloidal turns 7, toroidal turns 8 and the supply cables for both of these are laid into grooves machined into the core winding form, suitably G-10 epoxy-gloss laminate plates 12. As is illustrated in FIG. 5a, the toroidal windings 8 are supported against side loads in helical grooves machined into the surface of the core form, and then tightly over-wrapped with B-stage fiberglass armature banding tape 14 to resist the radial loads.

Figure 5A:
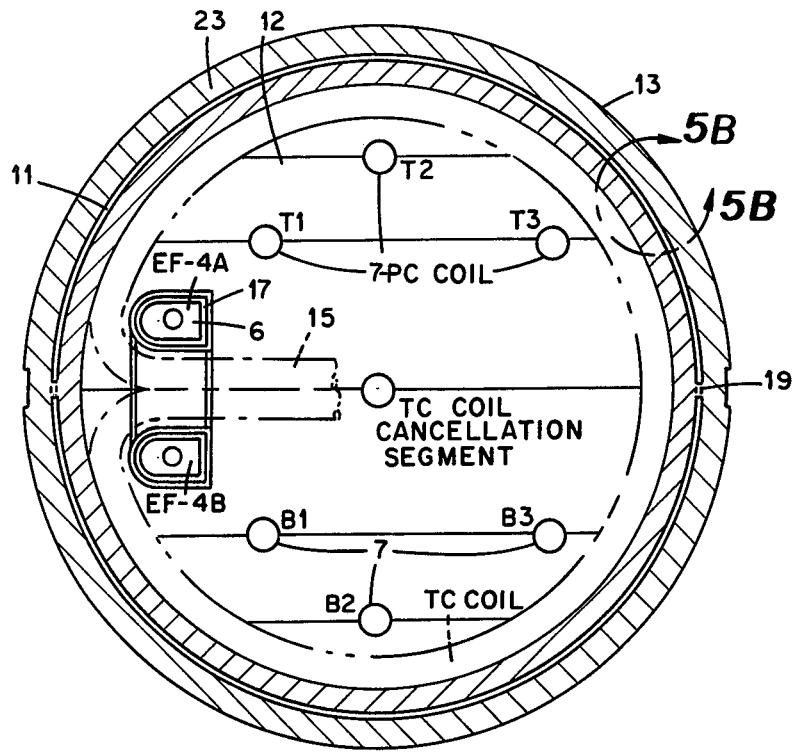
FIGS. 5a and 5b depict cross-sectional views of the flux core of FIG. 4.
Figure 5B:
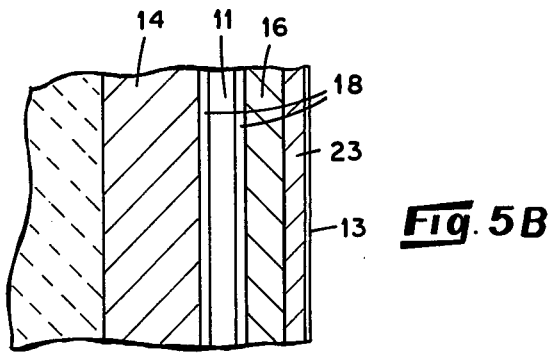

Referring to FIGS. 5a and 5b, the core is assembled as follows in accordance with the exemplary embodiment: The core is made from a stack of G-10 rings 12 cut from plates which are machined to make the core form containing grooves that accept the PC, EF and TC windings. PC cables T2 and B2 are laid into their grooves in the core form plates which have been painted with a thixotropic epoxy with a long pot life to assure a zero clearance fit. The leads 4 are fed through aisles 15 in the core and potted in place. PC cables T1, T3, B1 and B3 are installed in a manner similar to those above, with enough cable on each of the six sectors to complete the TC windings. The EF-4 winding 6, which is a conventional water-cooled copper conductor, is prewound and grouted with epoxy into its cavity 17. The entire stack is then bolted together and cured.

The toroidal winding cables are laid into grooves machined in the surface of the core form 12 and the leads fed through their access ports 15 in the core. Both the toroidal grooves and lead aisles 19 are first painted with thixotrophic epoxy to assure a zero clearance fit.

Finally, cross-shaped lead supports (not shown in FIGS. 5a and 5b) are installed in order to isolate the leads from each other. Armature banding tape 14 is then wrapped over the torus to resist current produced forces within. The aluminum shell 11, having been insulated with Kapton tape 18, is then placed onto the core with thixotropic epoxy between it and the core to fill all voids.

Additional armature banding tape 16 is then wrapped over the torus with modest tension and cured in layers to avoid wrinkling (which would have a detrimental effect on its load carrying ability). This tape layer resists the forces on the torus due to the current flowing in the shell segments. The Inconel liner 13, support tubes 3, and metallic covers for lead tubes 4' (not shown in FIGS. 5a and 5b) are then welded over the core and vacuum sealed. A urethane primer is applied to the inside of the liner 13 to increase the bond of the urethane compound which will fill the voids between the core 2 and liner 13. The entire assembly is placed in a vacuum enclosure and the annulus between the liner and core is potted with urethane 23. The potted assembly is cured and tested, and may then be installed into the vacuum vessel 1.

Equilibrium Field Coil System

Figure 6:
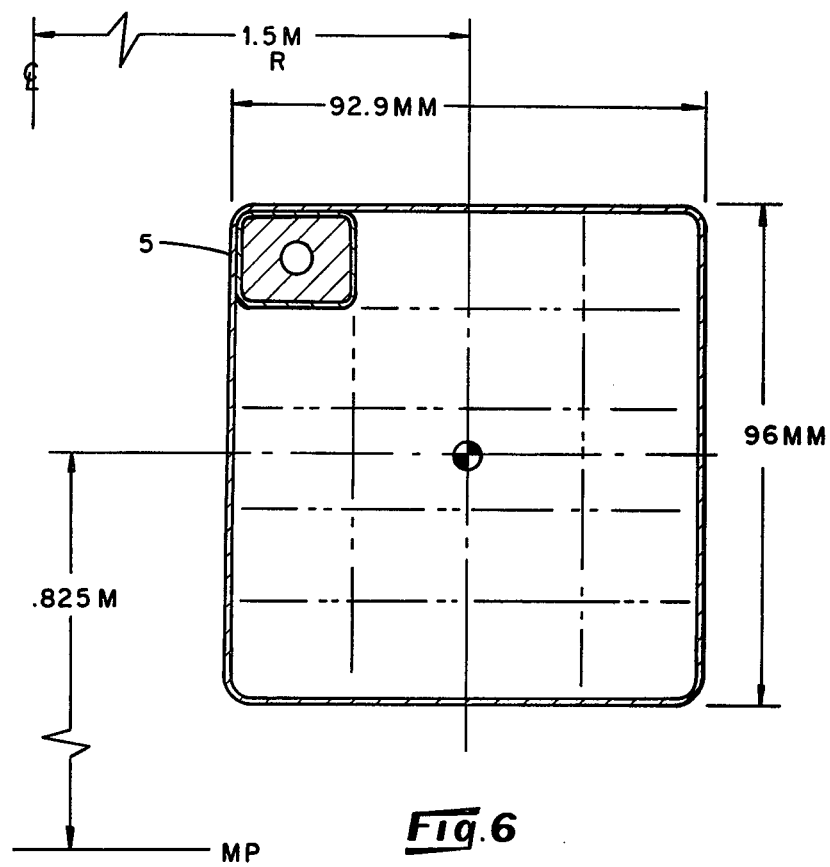
FIG. 6 is a cross-sectional view of an equilibrium field coil.

As noted above, the equilibrium field system as seen in FIGS. 3a, 3b and 6 consists of two sets of three conventional water-cooled copper coils 5 located outside the vacuum vessel 1 and one set of coils 6 inside the flux core 2. This arrangement of coils is designed so as to minimize plasma loss to the flux core 2, i.e., so that the flux core surface coincides with a poloidal flux surface. These coils are powered in a series arrangement by a pair of generators.

The equilibrium field coil system provides a vertical field with a moderate curvature that serves two functions; it provides an equilibrium by restraining the tendency of the toroidal plasma current to expand and it determines the shape of the plasma by varying the index "n" of the equilibrium field ($\phi_{EF}$) (where $\phi_{EF} = Ar^{-n}$).

In order to minimize plasma loss to the flux core, it is desirable that the surface of the flux core 2 coincide with a poloidal flux (constant $\psi$) surface. Because the equilibrium field is pulsed on a long time scale the fields penetrate all conductors (including the vacuum vessel 1, Inconel liner 13 and aluminum shell 11 described above), and matching the core surface to a $\psi$ surface is a difficult constraint to satisfy. Using external coils only and at the same time providing the variable field index feature required for plasma shaping studies, it has been found that an excessive amount of poloidal flux ($\Delta\psi$) intercepts the flux core. A solution to this problem, which constitutes a part of the present invention, is to add equilibrium field turns to the inside of the flux core 2.

Figure 7A:
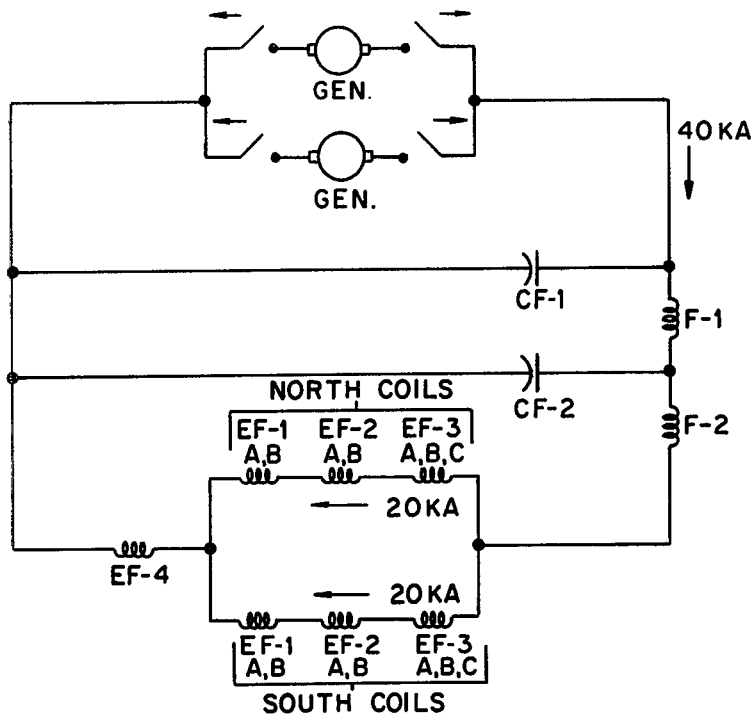
FIGS. 7a and 7b are equivalent diagrams of the EF coils for modes A, B, C and D of operation.
Figure 7B:
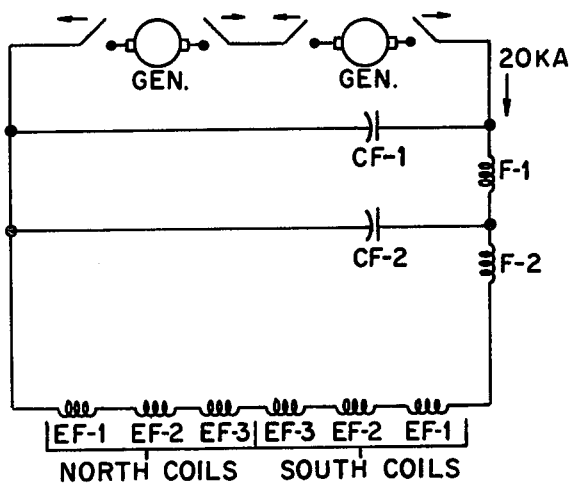

The EF coil system is shown in relation to the total structure of the exemplary embodiment in FIG. 3a. The exemplary system may operate at field indices of −0.033, +0.060, +0.124 and +0.354. As previously mentioned, all of the EF coils are located outside of the vacuum vessel 1 except for the winding 6 located inside the core 2. The system is powered by large generators in the various index modes by making the appropriate bussing changes to engage or disengage from the circuit various combinations of coil turns within each of the equilibrium coils EF-1, EF-2, EF-3 and EF-4. The circuit arrangements which permit the various index modes to be realized in accordance with the present exemplary embodiments are schematically illustrated in FIGS. 7a and 7b, the coil specifications being given in Table 3.

initiated about 75 mocroseconds before time zero. The PC current builds up to a peak value of about 450 kA at time zero, then rings through zero to a negative maximum of about 300 kA. At this point the crowbar igni-

TABLE 3

EQUILIBRIUM FIELD COIL DATA

| COIL NO. | NO. TURNS | MEAN RADIUS IN./M. | COPPER AREA IN$^2$ | RESISTANCE m$\Omega$ (20° C.) | $\Delta$T PULSE °C. | GPM AT $\Delta$P = 120 psi | MAX CU TEMP °C. | $I_p$ kA | ESW SEC | REP RATE SEC | COPPER WT LBS | (kA$^J$/in2) |
|---|---|---|---|---|---|---|---|---|---|---|---|---|
| EF-1A | 14 | 31.496/0.80 | 0.907 | 2.071 | 11.4 | 2.9 | 30.9 | 20 | 2 | 180 | 812 | 22 |
| EF-1B | 14 | 31.496/0.80 | 0.907 | 2.071 | 11.4 | 2.9 | 30.9 | 20 | 2 | 180 | 812 | 22 |
| EF-2A | 15 | 59.055/1.50 | 0.907 | 4.16 | 11.4 | 1.75 | 62.8 | 20 | 2 | 180 | 1627 | 22 |
| EF-2B | 15 | 59.055/1.50 | 0.907 | 4.16 | 11.4 | 1.75 | 62.8 | 20 | 2 | 180 | 1627 | 22 |
| EF-3A | 9 | 71.388/1.81 | 0.907 | 3.015 | 11.4 | 2.093 | 44.4 | 20 | 2 | 180 | 1181 | 22 |
| EF-3B | 7 | 70.669/1.795 | 0.907 | 2.66 | 11.4 | 2.25 | 39.6 | 20 | 2 | 180 | 1040 | 22 |
| EF-3C | 5 | 70.394/1.788 | 0.907 | 1.65 | 11.4 | 2.94 | 27.8 | 20 | 2 | 180 | 647 | 22 |
| EF-4 | 1 | 35.040/0.89 | 0.844 | 0.22 | 57.3 | 3.15 | 65.9 | 40 | 2 | 180 | 74 | 47.4 |

TOTAL SYSTEM WT: 15,640 lbs
TOTAL COOLANT FLOW RATE: 39.5 GPM
NOTE: Two of each coil type exists due to symmetry about the mid-plane of the device.

The EF coils are made up of several individual, stacked double pancake windings. This simplifies manufacture and provides an easy method of varying the relative NI of the coils comprising the equilibrium field system.

In the exemplary embodiment the conductor of each EF coil is extruded copper conductor 0.810"×1.272" with a centrally located 0.360" diameter coolant hole. This conductor is stretched, reducing its area 2 percent, to raise its yield point to approximately 12 ksi and to straighten the coiled conductor. Eight layers of 0.00325" Mylar tape is applied as the primary electrical insultation, followed by four layers of Scotchply B-stage epoxy-glass tape, 0.010 thick to bond the turns together. Each entire EF coil is toroidally over-wrapped with 0.188" of additional Scotchply for mechanical reinforcement and protection against electrical faults to ground. The EF coils are press-cured in a fixture which provides pressure on all surfaces.

Power Supplies

Figure 8:
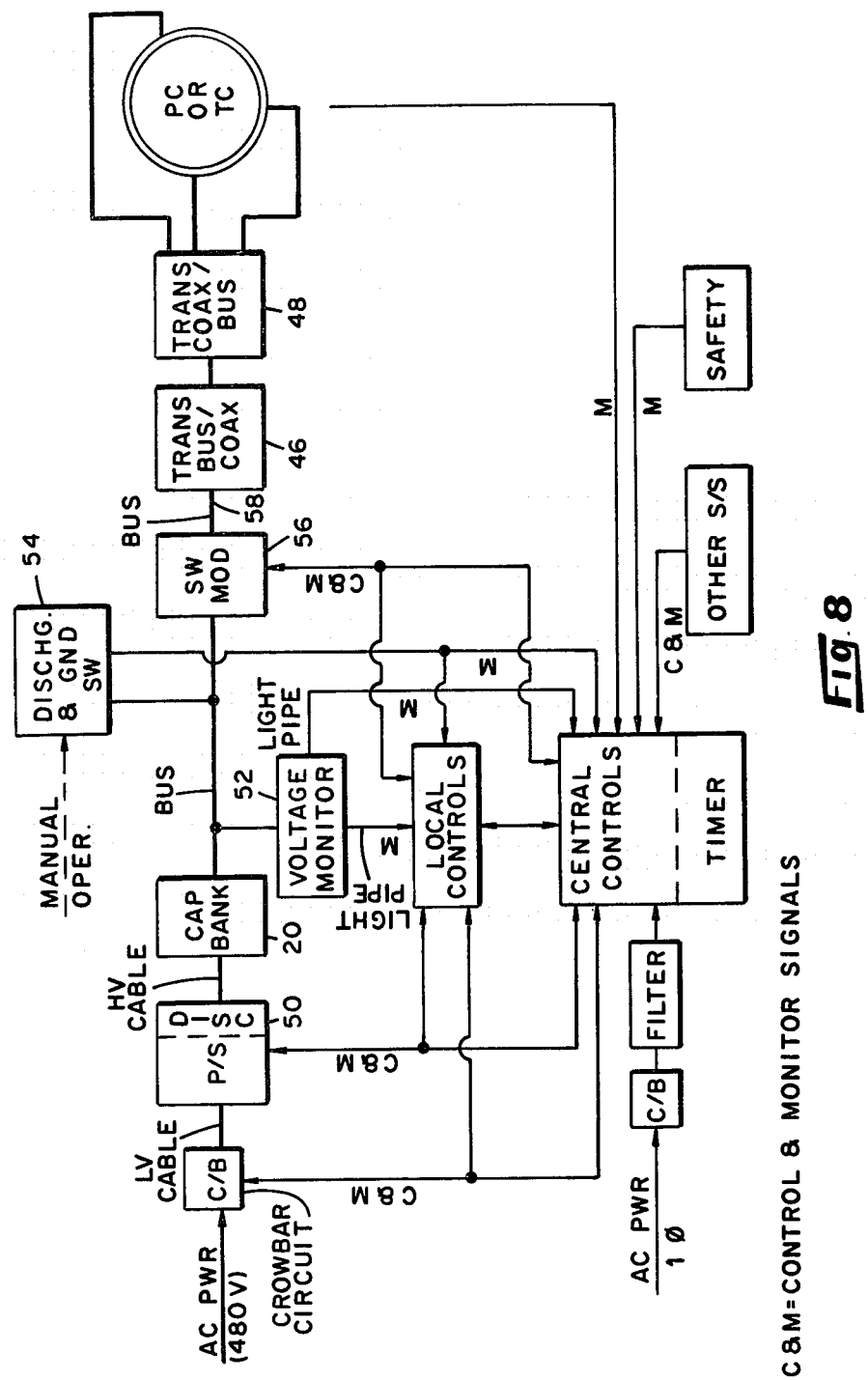
FIG. 8 is a block diagram of the power systems for the toroidal field coil and the poloidal field coil.

Turning now to the energy system provided for the formation coils (TC and PC coils), FIG. 8 is a block diagram of the capacitive discharge power supply system. Each capacitor bank 20 (for the PC coils, the TC coils forward bias and the TC coils reverse bias) has its own dedicated charging supply whose output (up to 20 kV on the present example) is connected through high voltage disconnects 50.

Capacitor bank voltage monitoring circuits 52 provide control and display signals. Output discharge and grounding switches 54 are also provided. The capacitor banks are connected to their loads through switch modules 56 (ignitrons), rigid bus work 58 and high voltage cables 46 and 48.

Figure 9A:
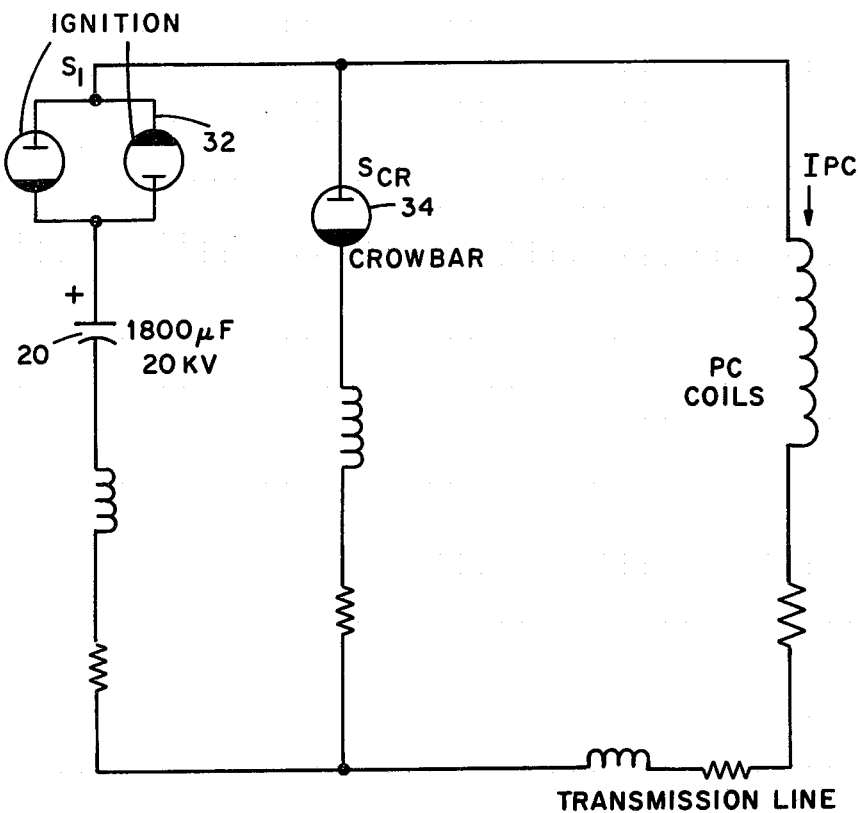
FIGS. 9a, 9b and 9c are equivalent schematic diagrams of the power supply circuitry for the poloidal, toroidal and equilibrium field coils, respectively.

FIG. 9a depicts an equivalent circuit for the power supply for the PC coils 7. The load consists of six parallel poloidal coils 7 embedded in the flux core 2. The capacitive discharge supply 30 consists of a 1800 uF, 20 kV capacitor bank 20 with its charge and discharge circuits.

The switch module 32 connecting the capacitor bank to the PC coil load is made up of five forward and five reverse 25 kV, 300 kA (Size D) ignitrons in parallel. A crowbar switch 34 consisting of 5 ignitrons in parallel provides current free wheeling through the load.

Figure 10A:
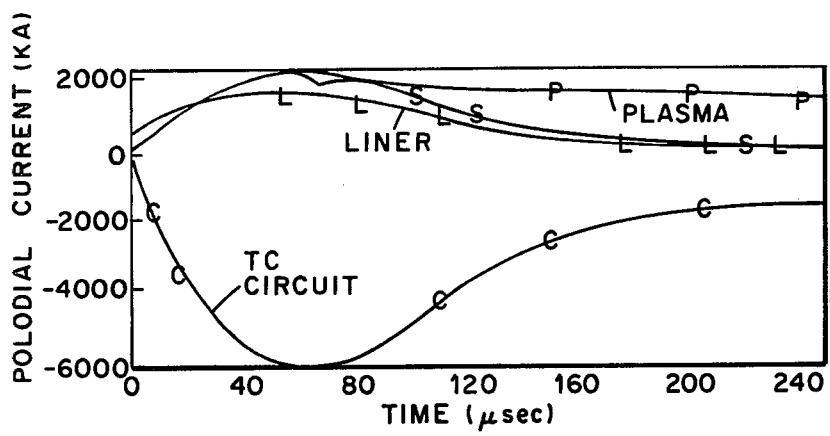
FIGS. 10a and 10b are graphical representations of the time variation of the currents in the plasma, and in the toroidal, poloidal and equilibrium field coils.
Figure 10B:
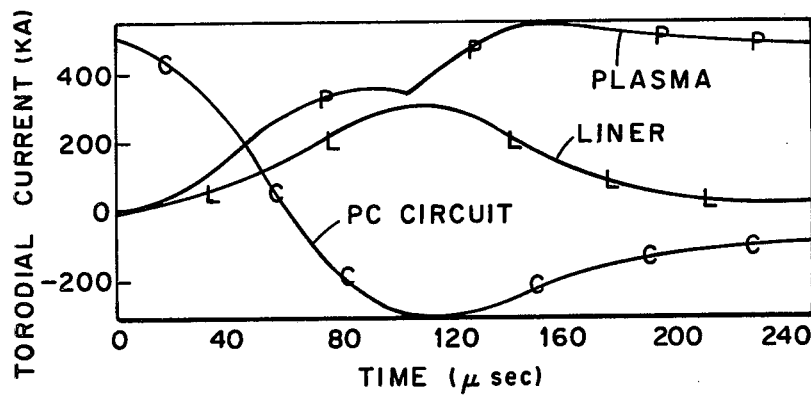

The PC current trace for operation of the exemplary embodiment is shown in FIG. 10b. The PC current is initiated about 75 mocroseconds before time zero. The PC current builds up to a peak value of about 450 kA at time zero, then rings through zero to a negative maximum of about 300 kA. At this point the crowbar ignitrons 34 are fired and the coil current decays with the L/R time constant of the circuit. Thus, the anti-parallel ignitrons 32 are provided for switching since the poloidal field current rings from a positive to a negative polarity and is then crowbarred.

Figure 9C:
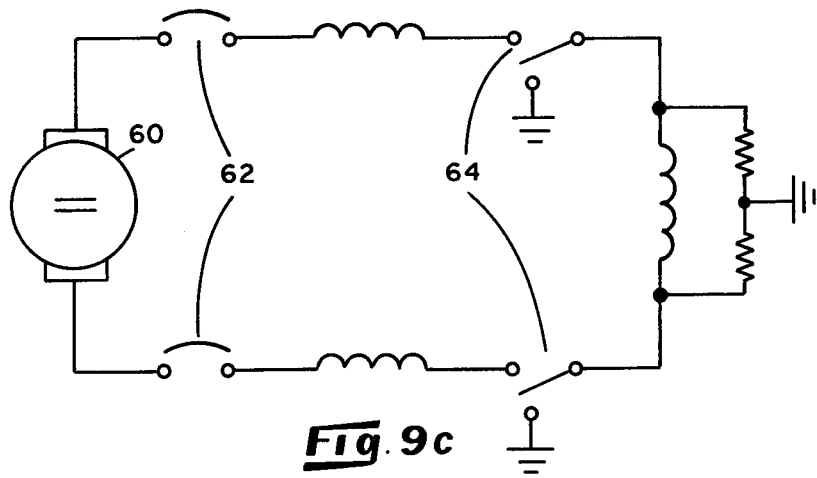
Figure 9B:
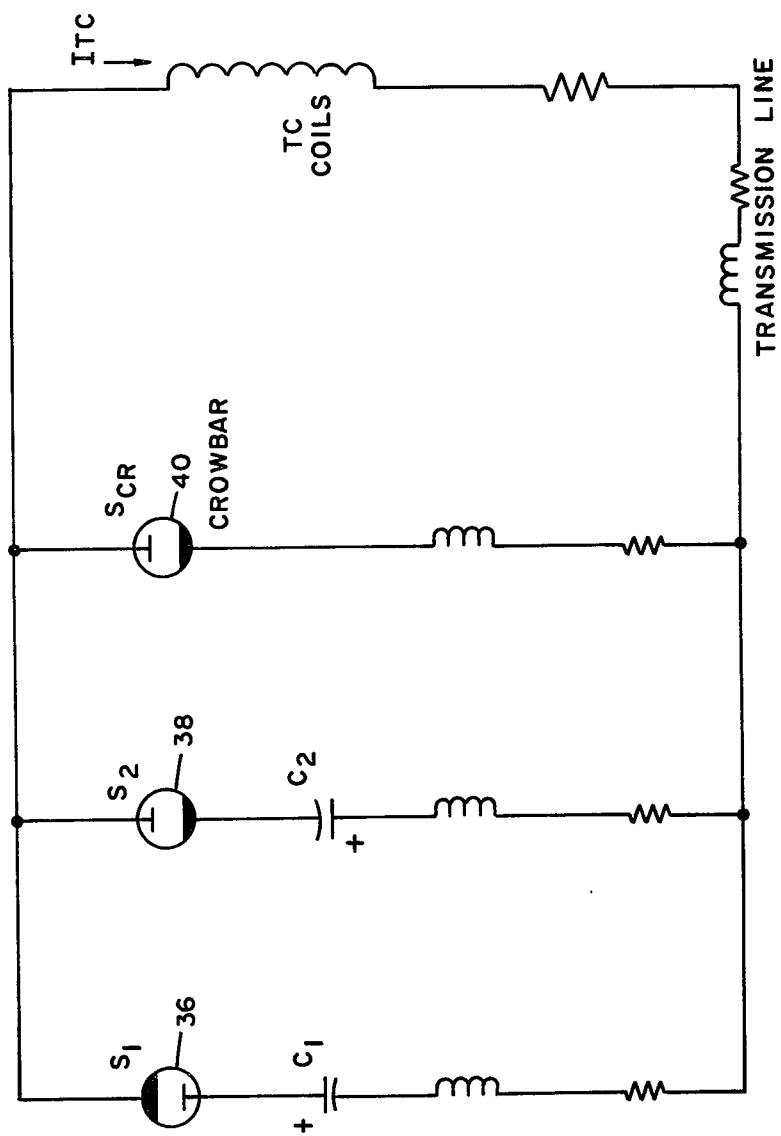

FIG. 9b depicts an equivalent circuit of the power supply for the TC coils. In the exemplary embodiment illustrated the power supply consists of two capacitor banks 20 ($C_1$ and $C_2$) with their separate charging and discharging circuits. Capacitor bank $C_1$ provides 300 $\mu$fd of capacitance made up of 20 cans of 60 $\mu$fd each in a series parallel arrangement. The bank $C_1$ has a 40 kilovolt capabilty because of possible fault requirements. Capacitor bank $C_2$ contains 2040 $\mu$fd of capacitance made up of 34 cans of 60 $\mu$fd each in a parallel arrangement. For normal operation both banks are charged to 20 kv.

In operation, capacitor bank $C_1$ is switched across the load at about 150 $\mu$sec before time zero. Two parallel ignitrons 36 provide the switching. At time zero, when the current from the first bank $C_1$ crosses zero, the second bank $C_2$ is fired through a ten tube series-parallel ignitron switch module 38. The current will rise to about 500 kA in 100 $\mu$sec, at which point the crowbar ignitrons 40 are fired and the coil current decays with the L/R time constant of the circuit.

FIG. 9c depicts the power supply for the EF coils in accordance with the present exemplary embodiment. Two large generators 60 with associated high-speed resistor breakers 62 and motor-operated safety disconnect switches 64 provides the EF coils with power. The two generators 60 are each capable of being pulsed to 22,300 amperes with an equivalent standard pulse with 5 seconds once every two minutes, and is operated in series at a total voltage of 1600 V. A bus and switch system connects the generators 60 to the outer EF coils 5 and inner EF coil 6.

Referring again to FIG. 8, solid rigidly supported copper buswork interconnects the capacitors within each capacitor bank 20 and provides a termination for connection of the charging supply (one for each capacitor bank) and for connection of the bank output to its switch module 56. All buswork is mechanically braced for maximum possible fault currents, insulated for high voltage, and adequately sized for natural cooling during normal duty cycle operation. It is also configured for low self inductance.

High voltage cable is provided from each charging supply to the capacitor bank 20 as well as from the output terminals of the switch module 56 to the TC and PC coils and also to grounding and disconnect switches.

At the output of the switch modules 56 rigid bus to coaxial cable transition blocks 46 are provided, insulated for the high voltage and sized for the current required. In accordance with the exemplary embodiment the transmission line 58 from the switch modules 56 to the TC and PC coils consist of multiple parallel coaxial cables the number of which is selected for low self inductance. The PC and TC coil groups are each fed with a minimum of 18 parallel RG coaxial cables in three groups of six cables whose total parallel self inductance is a maximum of 0.25 microhenry with an AC resistance of approximately 2 milliohms. At the coil ends, these coaxial cables are terminated on coaxial to bus transition blocks 48, similar to the blocks 46 used at the switch modules.

Vacuum System

Figure 11:
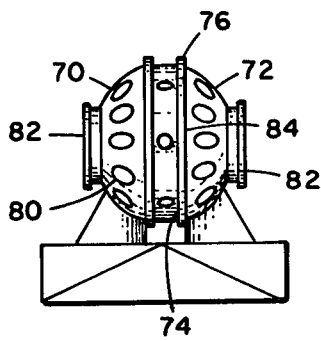
FIG. 11 is a front view of the vacuum vessel of the present invention.

Referring now to FIGS. 3a and 11 the vacuum vessel 1 of the present exemplary embodiment is made up of three ½"-thick type-304 stainless steel segments. They include two dished heads (left side head 70 and right side head 72), with constant-radius dishes, and one central-rolled cylinder 74. The heads 70 are 150-cm-radius preformed weldments which are commercially available. The central-rolled segment 74, also 150 cm in radius, is bolted to the left head 70. The joint between the cylinder 74 and the right head 72 is flanged, allowing access from the left side of the machine. A dummy flange 76, welded at the right head cylinder weld line, assures symmetrical eddy current effects.

The basic porting scheme consists of 20-cm and 40-cm ports 80, arranged alternately on 45° radial lines from the machine center line. In total, there are sixteen 40-cm ports and sixteen 20-cm ports. Additional ports are provided for the vacuum pump, and for the toroidal core and poloidal core lead outs. Two large ports 82, 70-cm, at the two sides of the machine are arranged coaxially on the horizontal center line. Eight 20-cm ports 84 are also provided on the vertical midplane, equi-spaced about the equator of the cylinder 74. The main vacuum tank seal, at the parting flange, is of Viton O-ring design. External clamps spaced around the outside of the flange are used for seal compression. All ports are also of Viton O-ring design.

The volume of the vacuum vessel 1 is approximately 9500 liters. The gas load for the vacuum pumping system (not shown in the drawings) is mostly outgassing of the materials used for construction of the vacuum vessel 1. In order to pump down the vessel $1 \times 10^{-6}$ torr in approximately 29 minutes, two parallel mechanical pumps of high capacity may be used. The vacuum pumping system of the present exemplary embodiment includes two parallel pumping stacks each including a 1500 liter per second turbo molecular pump, a 200 liter per second blower, and a 30 liter per second mechanical pump. The pump system used is provided with a large enough diameter pump lines to achieve a net pumping speed of 1200 liters per second at the vacuum vessel. The system is capable of achieving a base pressure of $6 \times 10^{-8}$ torr. For attaining lower pressures of approximately $2 \times 10^{-8}$ torr, titanium getters may be employed.

The Formation Process

As indicated graphically in FIGS. 10a and 10b, the operating procedure used in the formation process includes pulsing up the vacuum poloidal field at a time when there is no current present in the toroidal field winding, and then initiating the plasma discharge by pulsing the toroidal coil current.

Initially, the entire vacuum vessel 1 will be evacuated and then filled to a neutral pressure of about a few micron. The pulsing of the toroidal field circuit will ionize a plasma layer at the surface of the flux core 2, and will "unpinch" it away from the surface. In an optional mode, the toroidal field generating coil 8 is provided with an initial bias to produce an initial toroidal magnetic field before the step of pulsing that coil, so as to provide an ionized plasma just prior to the initiation of the main plasma discharge. As the discharge volume expands, neutral gas will be swept up by thermal motion, which is not negligible on the several microsecond time scale of the initial formation process. With this overview, the formation process will now be described in detail, with reference to a particular experiment run by the inventors.

Figure 12:
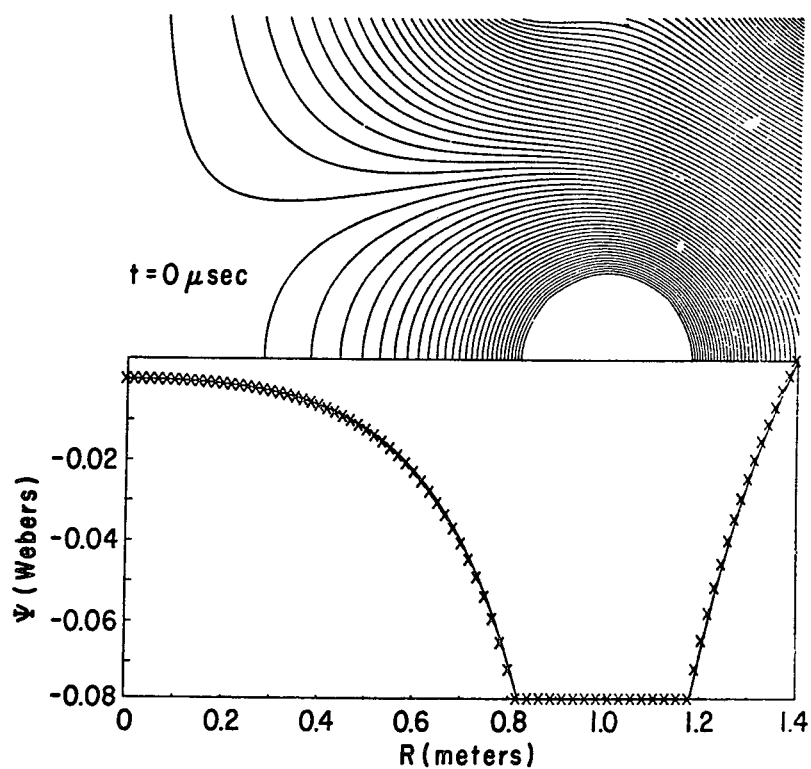
FIG. 12 is a graphical representation of the poloidal magnetic flux produced at the time $t=0$ in accordance with the method of the present invention.

The volume between the flux core and the vacuum chamber is first filled with hydrogen gas at the density between $3 \times 10^{13}$ and $10^{14}$ particles/cm$^3$. FIGS. 10a and 10b show the computed currents in the circuits, flux core liner and plasma as a function of the time t. Before preionization, the EF and PC currents have been brought up slowly to their peak values. At $t=0$, when the plasma is preionized, the TC capacitor banks $C_1$ and $C_2$ are discharged initiating a negative current in the TC circuit. Simultaneously, the PC circuit is closed, causing the current to decrease by recharging the PC capacitors 20. The simultaneous increasing of the TC current and decreasing of the PC current leads to a balance at the surface of the flux core so that the resultant normal component of the velocity, $V_n = E_P B_T - E_T B_P$, is approximately zero. At the times when the voltage drop across the capacitors corresponding to the TC and PC circuits reach zero, times $t=100$ $\mu$sec and $t=150$ $\mu$sec respectively, in the present example, the currents in the TC and PC circuits are crowbared and allowed to decay resistively. In response to the changing circuit currents, poloidal and toroidal currents are induced into the flux core liner and plasma as indicated in FIG. 10b. FIG. 12 shows the poloidal magnetic flux distribution at time $t=0$. Only the contours on the upper half plane are plotted since the device is symmetric about the midplane. The lower part of FIG. 12 shows the poloidal flux on the midplane plotted against the major radius R.

Figure 13:
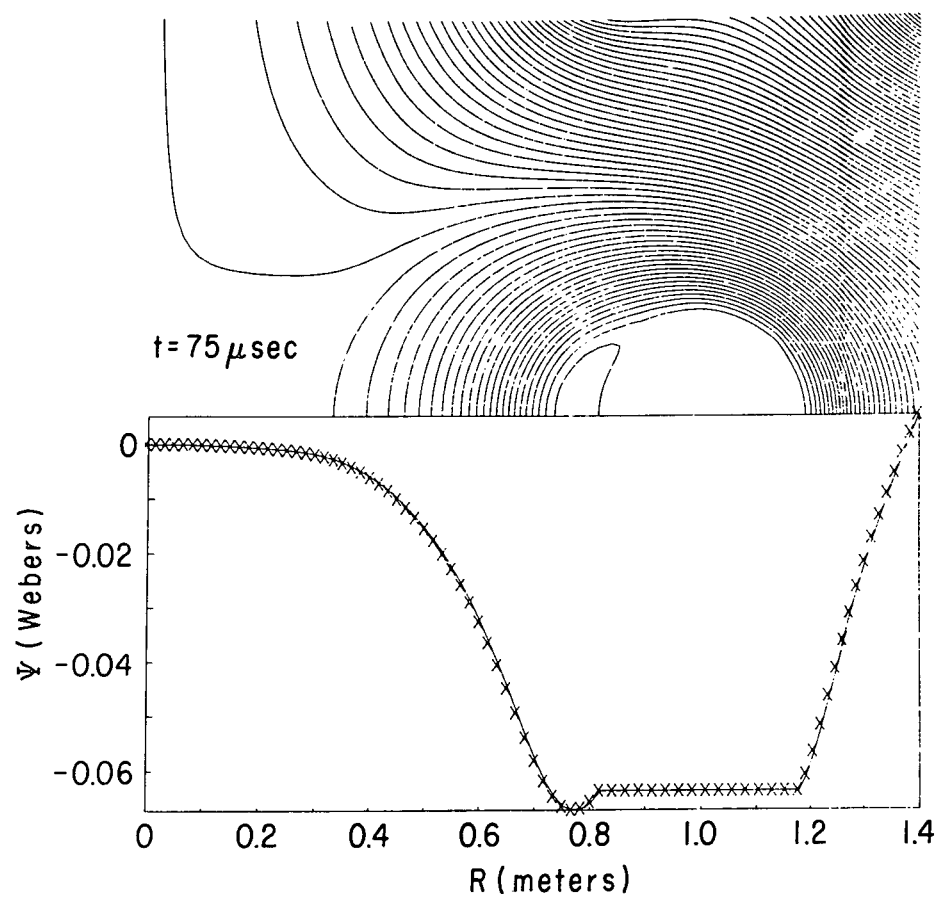
FIG. 13 is a graphical representation of the poloidal magnetic flux at the time $t=75$ microseconds in accordance with the method of the present invention.

A variation of the above described method would be to increase the relative strength of the TC current resulting in an uncompensated outward normal velocity. This additional toroidal flux would be trapped within the poloidal flux surfaces, inflating them and forcing them radially inward. FIGS. 13 through 16 show the distribution of the poloidal magnetic flux, the toroidal current, the toroidal magnetic field, and the poloidal current at time $t=75$ $\mu$sec. Comparison of FIG. 12 with FIG. 13 shows that after 75 $\mu$sec, the value of the poloidal flux at the flux core surface $\psi$ increases from $\psi_c = -0.080$ to $\psi_c = -0.063$. The increase of $\psi_c$, through magnetic induction, has caused a local minimum to form between the symmetry axis 10 and the flux core 2. This local minimum is to become the magnetic axis of the spheromak plasma.

Figure 14:
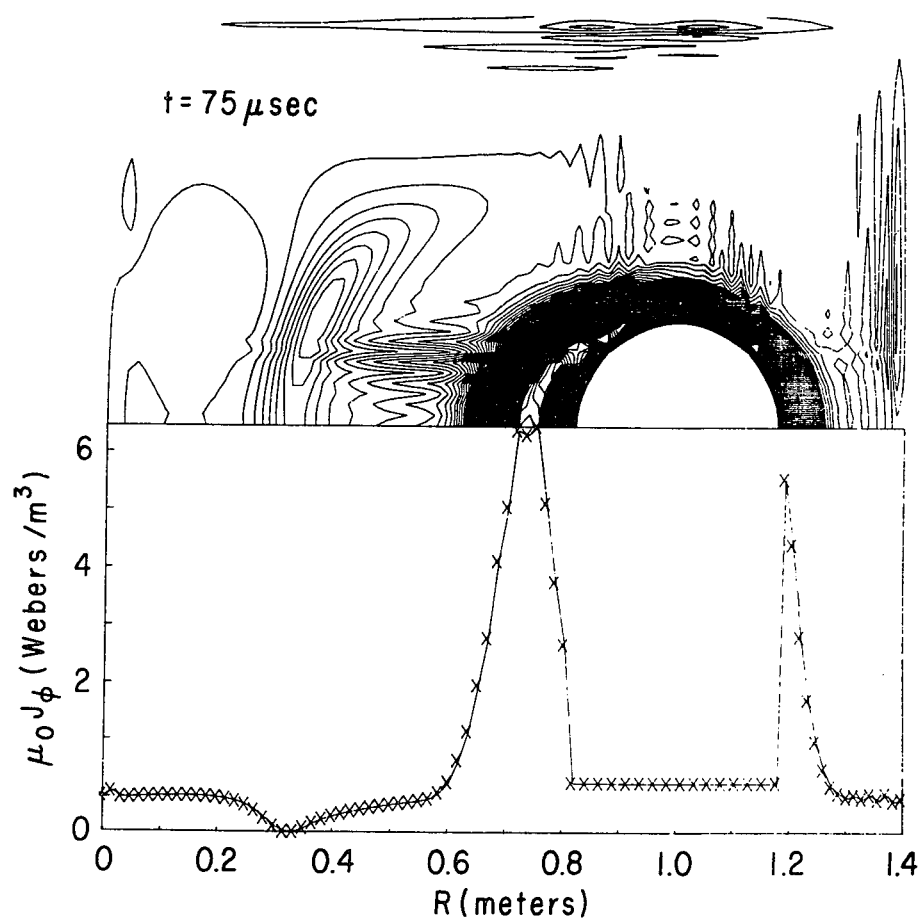
FIG. 14 is a graphical representation of the toroidal plasma current at the time $t=75$ microseconds in accordance with the method of the present invention.

FIG. 14 shows the toroidal current density in the plasma, $\vec{J}_T$ at the time t=75 μsec. At this time the plasma current is distributed around the flux core, but shows a preferential inward expansion toward the symmetry axis. This preferential inward expansion is dictated by the "external field" bias produced by the currents in the EF coils shown in FIGS. 3a and 3b.

Figure 15:
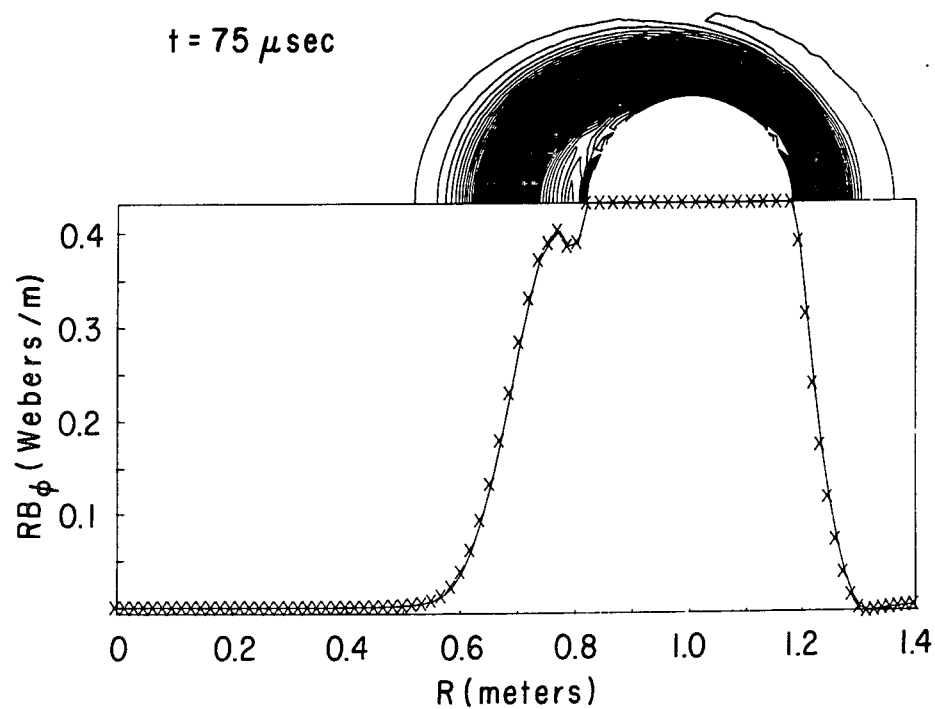
FIG. 15 is a graphical representation of the toroidal magnetic field at the time $t=75$ microseconds in accordance with the method of the present invention.
Figure 16:
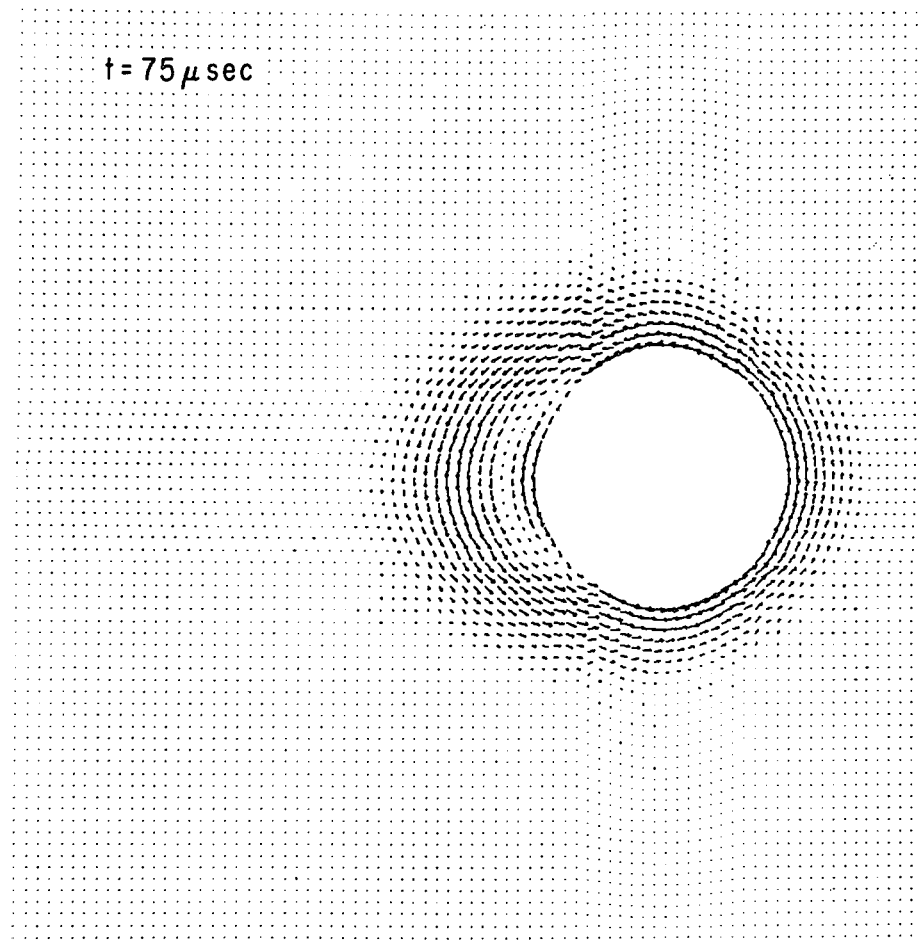
FIG. 16 is a graphical representation of the poloidal plasma current at the time $t=75$ microseconds in accordance with the method of the present invention.
Figure 17:
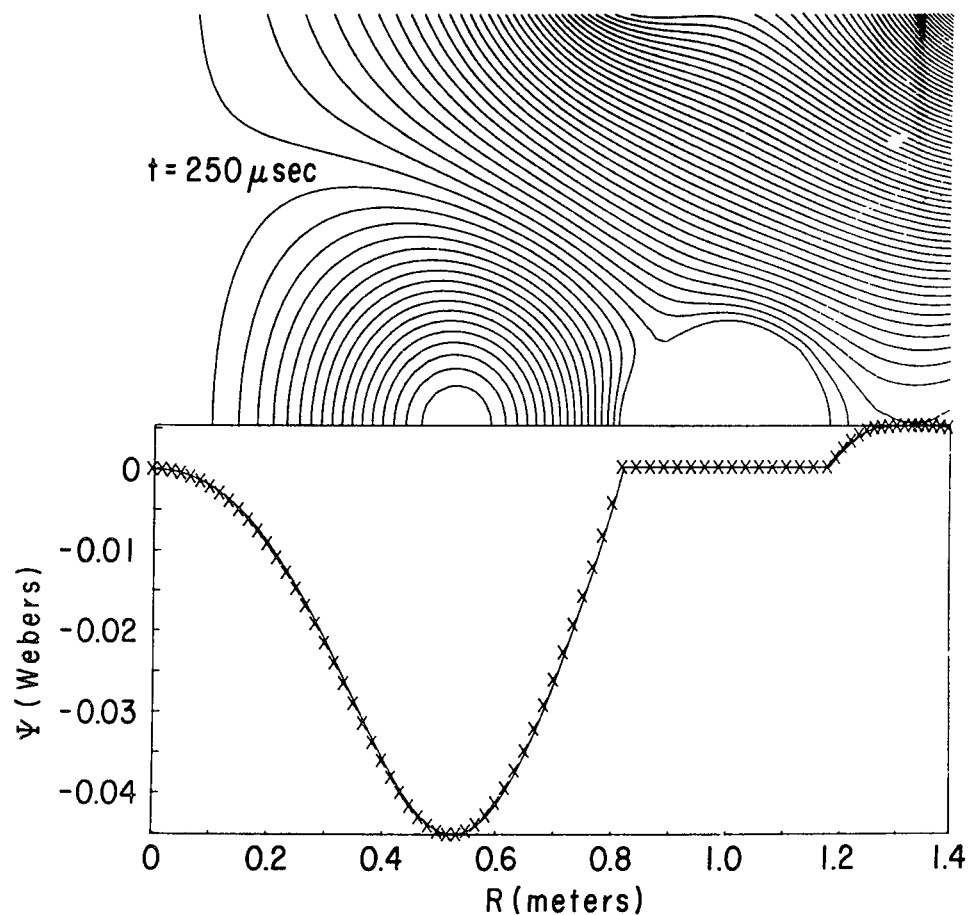
FIG. 17 is a graphical representation of the poloidal magnetic flux at the time $t=250$ microseconds in accordance with the method of the present invention.

FIG. 15 shows the toroidal field function $g=RB_T$ at times t=75 μsec, where $B_T$ is the magnitude of the toroidal magnetic field, and FIG. 14 shows vectors indicating the relative magnitude and direction of the associated plasma poloidal current $\vec{J}_p$. The poloidal current is induced into the plasma by the changing current in the TC circuit. The evolution of this current is governed by both resistive diffusion, and by the equilibrium equation, which dictates that the polodial current vectors lie in surfaces of constant poloidal flux. Since the poloidal flux surfaces are moving preferentially inward, the equilibrium constraint forces the toroidal field function contours to expand inward as well.

FIGS. 17 through 20 show the fields and currents at time t=250 μsec, when the spheromak configuration is fully formed. The magnetic axis is now located at R=0.53 m. From FIG. 17 it is seen that enough volt-seconds have been supplied by the PC circuit to raise the value of the poloidal flux on the flux core, $\psi_c$, to the zero value, the same as that on the symmetry axis. All of the poloidal flux surfaces between the symmetry axis and the flux core have negative values of $\psi$, corresponding to closed magnetic surfaces that do not encircle the flux core.

Figure 18:
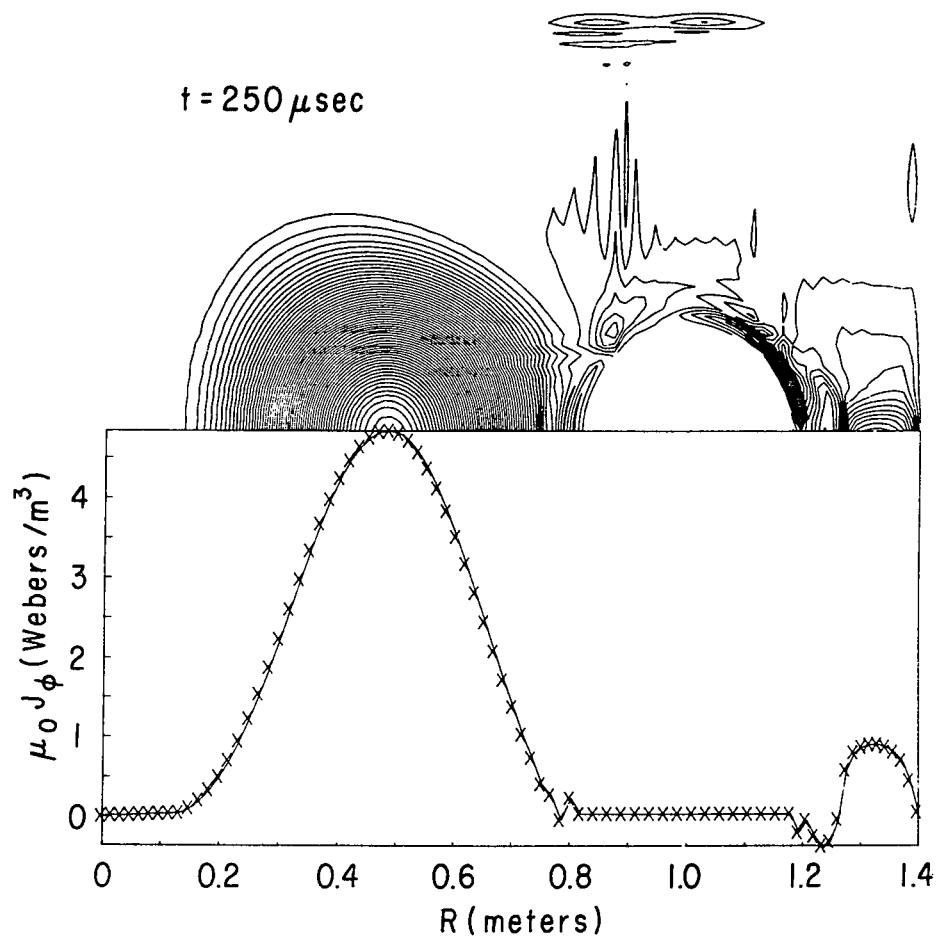
FIG. 18 is a graphical representation of the toroidal plasma current at the time $t=250$ microseconds in accordance with the method of the present invention.

FIG. 18 shows the toroidal current density at time t=250 μsec. Inward expansion has continued so that nearly all of the toroidal plasma current is now located in the confined region of closed magnetic field lines between the symmetry axis and the flux core. From FIG. 10(b) it is seen that the total toroidal current in the plasma is now about 500 kA, the same as the initial toroidal current in the PC circuit. This current has effectively been transferred from the flux core into the plasma by magnetic induction.

Figure 19:
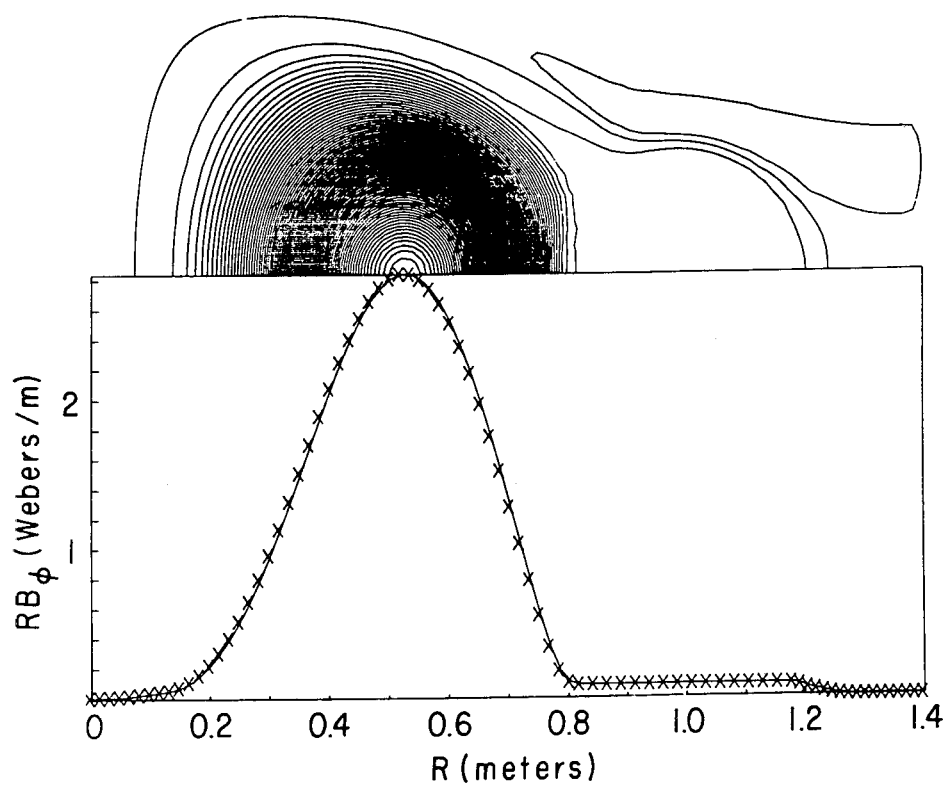
FIG. 19 is a graphical representation of the toroidal magnetic field at the time $t=250$ microseconds in accordance with the method of the present invention.
Figure 20:
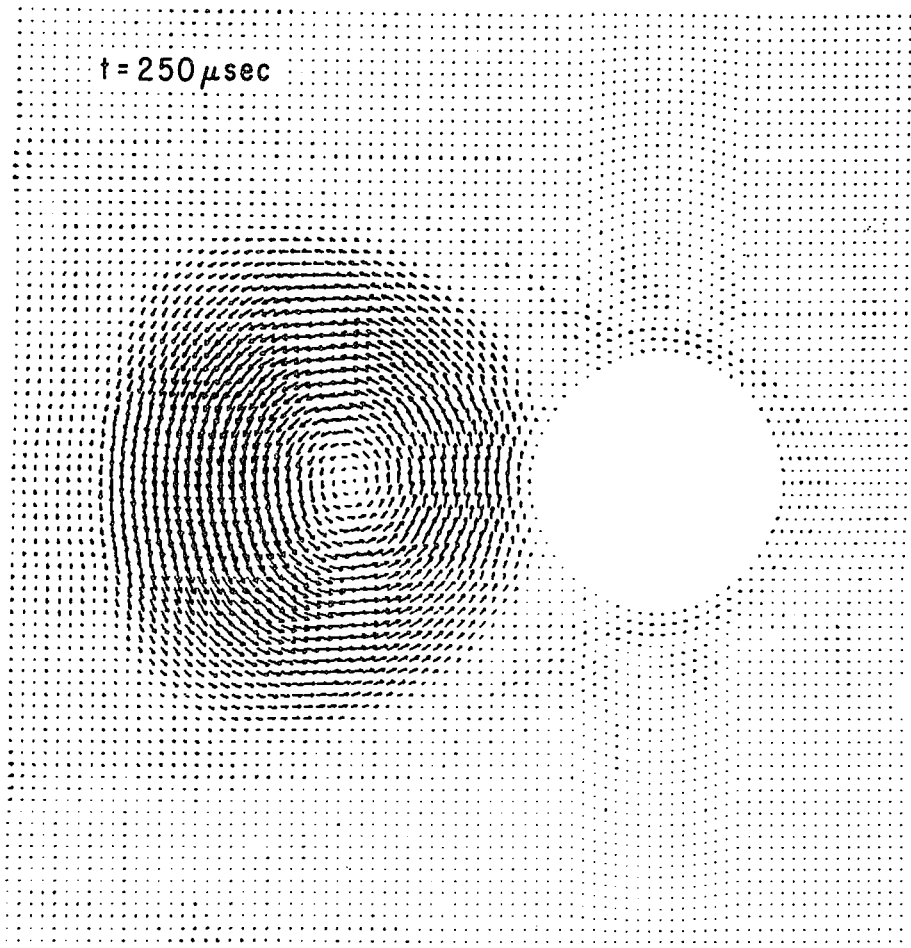
FIG. 20 is a graphical representation of the poloidal plasma current at the time $t=250$ microseconds in accordance with the method of the present invention.
Figure 21C:
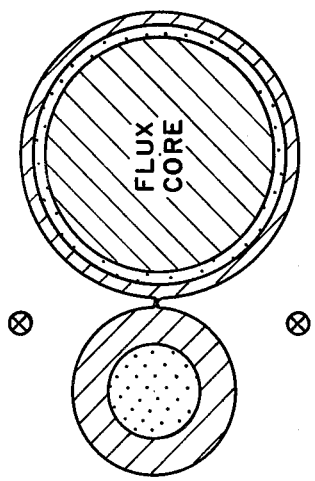
FIGS. 21a–21d illustrate four stages of development of a spheromak configuration in accordance with a prior method of operation of the apparatus illustrated in FIG. 1.
Figure 21D:
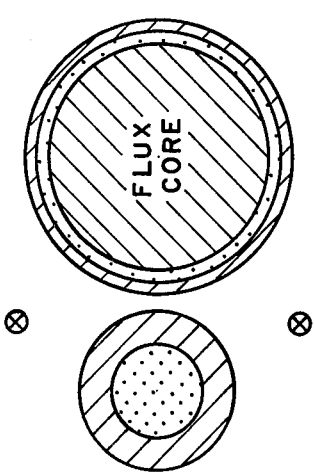
Figure 21A:
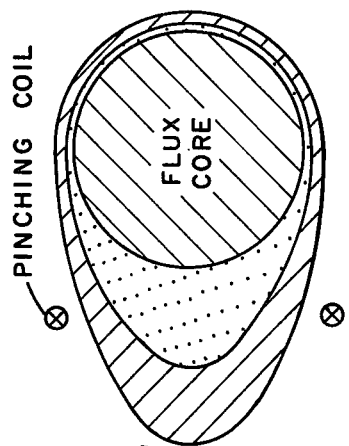
Figure 21B:
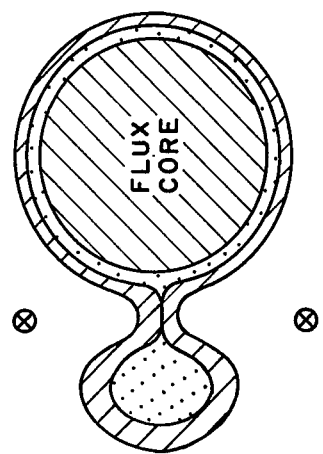

FIG. 19 shows the toroidal magnetic field function $g=RB_T$ at time t=250 μsec and FIG. 20 shows the associated poloidal current vectors. Essentially all of the toroidal flux has been "captured" in the closed magnetic field line region. From FIG. 20 it is apparent that in contrast to FIG. 16 the poloidal current paths encircle the magnetic axis but no longer encircle the flux core. Thus poloidal current, as well as toroidal current, has effectively been inductively transferred from the flux core into the final spheromak configuration.

Figure 22A:
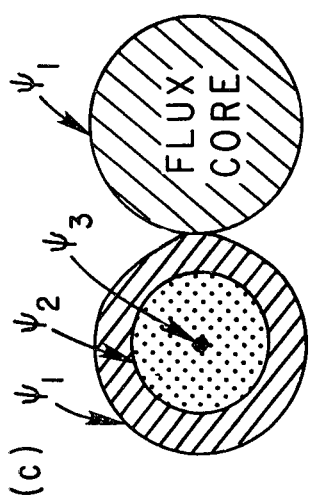
FIGS. 22a–22d illustrate four stages of development of the spheromak configuration formed in accordance with the method of the present invention.
Figure 22C:
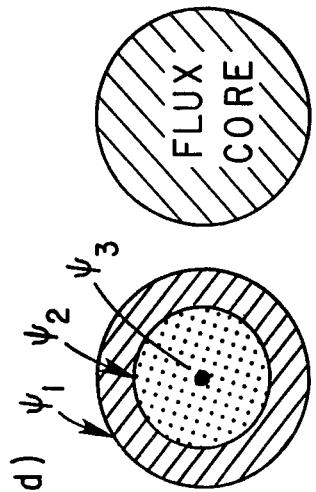
Figure 22B:
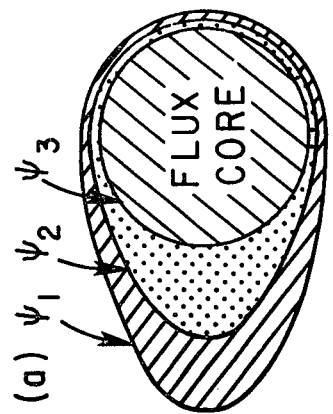
Figure 22D:
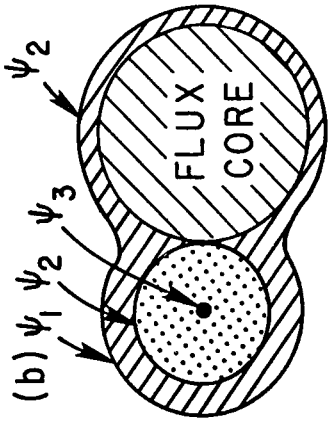

A schematic illustration of the spheromak formation process is given in FIGS. 22a–22d. FIG. 22a shows three poloidal flux surfaces $\psi_1 > \psi_2 > \psi_3$ at an early stage in the formation. The induction of a poloidal current around the flux core and its subsequent radial diffusion cause toroidal flux to exist in the volume between surfaces $\psi_1$ and $\psi_2$, and between surfaces $\psi_2$ and $\psi_3$. The toroidal electric field set up by the decreasing PC current in the flux core causes the value of the poloidal flux $\psi_c$ on the flux core to increase. FIGS. 22(a) through (d) illustrate the geometry as $\psi_c=\psi_3$, $\psi_c=\psi_2$, and $\psi_c=\psi_1$, and $\psi_c>\psi_1$. Note that all of the toroidal flux in the initial configuration 22a has been captured in the final spheromak configuration 22d.

The formation method of FIGS. 22a–22d is to be compared with the previously proposed formation method utilizing pinching coils, depicted in FIGS. 21a through 21d. In the pinching method, the value of the poloidal flux on the flux core, $\psi_c$, is held fixed while pinching coils are activated to "pinch off" a piece of the plasma to form a spheromak configuration. This method has the disadvantage of requiring an additional set of coils and is intrinsically less efficient. Only a fraction of the poloidal and toroidal flux which exists in the initial configuration of FIG. 21a can end up in the final spheromak configuration of FIG. 21d since a sleeve containing a substantial proportion of the initial quantity of flux containing plasma remains encircling the flux core. In the present method, essentially all of the poloidal and toroidal flux present in FIG. 22a can be captured in the spheromak configuration of FIG. 22d.

This invention has been described by way of illustration rather than limitation, and it is intended to cover in the appended claims all variations and modifications as fall within the true spirit and scope of the invention.

We claim:

1. In a method for producing and confining a plasma which includes the steps of:
    evacuating a vacuum vessel and filling said vessel with a neutral species;
    producing a first poloidal magnetic field within said vacuum vessel;
    producing a second poloidal magnetic field in said vacuum vessel by pulsing a current in a first direction through a poloidal field generating coil, the poloidal field generating coil located in a toroidal shaped flux core which is enclosed within a housing, such that said first and said second poloidal magnetic fields are superimposed to form a composite poloidal field in said vacuum vessel having regions of stronger and weaker strength;
    producing a toroidal magnetic field in said vacuum vessel by passing a current through a toroidal field generating coil which is located in said flux core, thereby initiating a plasma discharge and causing toroidal flux to appear outside of said flux core;
    expanding the plasma in the direction of said region of weaker poloidal magnetic field strength;
    producing an equilibrium magnetic field by passing a current through at least one external equilibrium field coil which is positioned outside of said flux core housing so as to set up an equilibrium magnetic field;
    an improved method of detaching said plasma from said flux core, comprising:
    producing, as part of the step of producing said second poloidal field, a composite magnetic field having field lines tangential to an outer surface of said flux core including the step of passing a current through an interior equilibrium field coil located inside of said flux core housing, so as to contribute to said equilibrium magnetic field; and
    reversing simultaneously the directions of currents in the poloidal field and the toroidal field generating coils such that a resultant normal component $V_n$ of the velocity of said plasma away from said flux core is approximately zero, said normal velocity component $V_n$ being characterized by the equation $V_n = E_p B_t - E_t B_p$, where $E_t$ and $B_p$ are electric and magnetic fields, respectively, set up by said poloidal field generating coil and where $B_t$ and $E_p$ are magnetic and electric fields, respectively, set up by said toroidal field generating coil, to pinch off at least most of said expanded plasma so as to cause poloidal magnetic field line reconnection within the pinched-off portion, thereby producing a detached plasma.

2. A method as in claim 1, wherein said toroidal field generating coil is provided with an initial bias to produce an initial toroidal magnetic field before the step of producing said toroidal magnetic field, so as to provide an ionized plasma just prior to the initiation of the main plasma discharge.

3. A method as in claim 1, wherein said expanding is effectuated by trapping the toroidal flux within the poloidal flux, such that the poloidal flux is inflated with increasing toroidal flux.

4. A method as in claim 1 wherein said step of producing a first poloidal magnetic field includes the step of drawing a current through a set of equilibrium field coils, said set of equilibrium field coils including at least two toroidal coils located outside said vacuum vessel.

5. A method as in claim 4 wherein said set of equilibrium field coils includes at least two pairs of ring-shaped coils, said step of producing a composite magnetic field having field lines tangential to said flux core includes the step of locating one of said at least two pairs of ring-shaped coils within said core.

6. In an apparatus for producing and confining a plasma, which includes;
a vacuum vessel;
a toroidal-shaped flux core disposed within said vacuum vessel and having a major radius and a minor radius, said flux core including a toroidal flux coil and an internal poloidal flux coil, said flux core contained within a flux core housing which is supported within said vacuum vessel and spaced apart from the inner walls thereof;
external equilibrium field coil means located outside of said flux core housing for producing a first poloidal magnetic field within said vacuum vessel directed primarily along the major axis of said flux core;
means for energizing said external equilibrium field coil means at a time $T_1$;
means for energizing said poloidal flux coil at a time $T_2$ greater than $T_1$ to create a second poloidal magnetic field within said vacuum vessel, said first and said second poloidal fields being superimposed to form a composite poloidal field of greater strength on the radially exterior major radius side of said flux core, and of lesser strength on a radially interior major radius side of said flux core;
means for energizing said toroidal flux coil at a time $T_3$ for initiating a plasma discharge within said vacuum vessel; and
said flux core and said equilibrium field coil means being operable to cause said flux to become expanded and distended, so as to bulge towards said major axis;
an improved means for detaching said plasma from said flux core, comprising:
internal equilibrium field coil means located inside of said flux core;
tangential means included in said equilibrium field coil means, for producing a composite magnetic field having field lines tangential to an outside surface of said flux core when said internal and said external equilibrium field coils and said poloidal flux coil are energized; and
pinching off means for pinching off said distended plasma from said flux core, including means for simultaneously reversing the direction of currents in said poloidal and said toroidal field coils, such that a resultant normal velocity component $V_n$ of said plasma away from said flux core is approximately zero, said normal velocity component $V_n$ being characterized by the equation $V_n = E_p B_t - E_t B_p$, where $E_t$ and $B_p$ are electric and magnetic fields, respectively, set up by said poloidal field coil, and $B_t$ and $E_p$ are magnetic and electric fields, respectively, set up by said toroidal field coil whereby at least most of said distended plasma is detached from said flux core.

7. Apparatus as in claim 6 wherein said equilibrium field coil means include a plurality of equilibrium field coils symmetrically located with respect to said flux core outside said vacuum vessel.

8. An apparatus as in claim 7 wherein said means for energizing said equilibrium field coils includes means for varying the index of the equilibrium field.

9. An apparatus as in claim 6 wherein said flux core further comprises means for inducing image currents serving to stabilize said plasma when said poloidal flux coil and said toroidal flux core are energized.

10. An apparatus as in claim 6 wherein said flux core includes means for maintaining a constant poloidal magnetic field at an outer surface of said flux core in the presence of time varying magnetic fields.

11. An apparatus as in claim 9 wherein said inducing means comprises means for maintaining a constant poloidal magnetic field at an outer surface of said flux core in the presence of time varying magnetic fields.

12. An apparatus as in claim 9 or claim 11 wherein said inducing means includes a conductive shell surrounding said poloidal coils and said toroidal coils.

13. An apparatus as in claim 12 wherein said conductive shell has both poloidally and toroidally directed cuts.

14. An apparatus as in claim 12 wherein said shell consists substantially of aluminum.

* * * * *